US011612158B2

(12) United States Patent
Martin et al.

(10) Patent No.: US 11,612,158 B2
(45) Date of Patent: Mar. 28, 2023

(54) WATER MOVEMENT SYSTEM AND METHOD FOR CONTROLLING WATER BREEDING INSECT POPULATIONS

(71) Applicants: Glen Babcock, Missoula, MT (US); Wendy Babcock Garrett, Missoula, MT (US)

(72) Inventors: Nathaniel J. Martin, Carmel Valley, CA (US); Glen Babcock, Missoula, MT (US); Wendy Babcock Garrett, Missoula, MT (US); James M. Martin, Pacific Grove, CA (US); Frank S. Martin, Pacific Grove, CA (US)

(73) Assignee: Glen Babcock and Wendy Babcock Garrett, Missoula, MT (US)

( * ) Notice: Subject to any disclaimer, the term of this patent is extended or adjusted under 35 U.S.C. 154(b) by 0 days.

(21) Appl. No.: 16/964,957

(22) PCT Filed: Jan. 25, 2019

(86) PCT No.: PCT/US2019/015270
§ 371 (c)(1),
(2) Date: Jul. 24, 2020

(87) PCT Pub. No.: WO2019/148022
PCT Pub. Date: Aug. 1, 2019

(65) Prior Publication Data
US 2021/0037802 A1 Feb. 11, 2021

Related U.S. Application Data

(60) Provisional application No. 62/622,708, filed on Jan. 26, 2018.

(51) Int. Cl.
*A01M 1/10* (2006.01)
*A01M 1/02* (2006.01)

(52) U.S. Cl.
CPC ............ *A01M 1/106* (2013.01); *A01M 1/023* (2013.01)

(58) Field of Classification Search
CPC ........ A01M 1/106; A01M 1/023; A01M 1/10; A01M 1/203; Y02A 50/30
(Continued)

(56) References Cited

U.S. PATENT DOCUMENTS 3,577,678 A    5/1971   Burton
3,673,733 A *   7/1972   Allen ..................... A01G 9/246
                                                                          165/47

(Continued)

FOREIGN PATENT DOCUMENTS

WO   PCT/US2006/032688     8/2006
WO   PCT/US2014-046574 A2   1/2015

*Primary Examiner* — Timothy D Collins
*Assistant Examiner* — Maria E Graber
(74) *Attorney, Agent, or Firm* — Sarah J. Rhoades

(57) ABSTRACT

A water movement system and method configured to eradicate and/or control mosquito or insect populations that lay eggs in treated, stagnant water environments. The system is comprised of a water pump configured to function in cooperation with an underwater insect attractant device. The insect attractant device is suitably constructed to generate carbon dioxide for attracting insects to a water extermination zone or trap. In one embodiment, the underwater insect attractant device contains organisms such as mycelia for generating the carbon dioxide. Insects are attracted by the carbon dioxide generation device to reproduce in the water extermination zone, using the treated water to lay eggs, and grow larvae and pupae for the subject insects. A solar-powered water pump device is configured to direct the flow of water from the water extermination zone toward filters of the water pump device to trap and kill insect progeny including eggs, larvae, and pupae.

10 Claims, 13 Drawing Sheets

(58) Field of Classification Search
USPC .......................................................... 43/107
See application file for complete search history.

(56) References Cited

U.S. PATENT DOCUMENTS

| | | | |
|---|---|---|---|
| 3,810,327 A | 5/1974 | Giansante | |
| 4,063,383 A * | 12/1977 | Green | A01G 18/66 206/439 |
| 4,639,422 A * | 1/1987 | Geimer | C12M 29/04 435/297.3 |
| 4,966,534 A * | 10/1990 | Hasslen, III | F04D 13/10 417/424.2 |
| 5,036,618 A | 8/1991 | Mori et al. | |
| 5,123,203 A | 6/1992 | Hiramoto | |
| 5,230,430 A * | 7/1993 | Kidder | A01G 18/66 206/439 |
| 5,620,314 A * | 4/1997 | Worton | F04B 9/14 92/162 P |
| 6,174,146 B1 * | 1/2001 | Lacy | F04D 15/0218 417/423.15 |
| 6,179,218 B1 * | 1/2001 | Gates | B05B 17/08 239/211 |
| 6,189,811 B1 * | 2/2001 | Rudy | F04B 17/006 239/525 |
| 6,346,141 B1 | 2/2002 | Nuckols et al. | |
| 6,490,824 B1 | 12/2002 | Maekawa et al. | |
| 6,748,696 B1 * | 6/2004 | Davidson | A01G 18/62 435/283.1 |
| 7,648,629 B2 * | 1/2010 | Prokopchuk | C02F 1/003 210/242.1 |
| 8,056,284 B2 * | 11/2011 | He | A01G 25/167 47/79 |
| 8,297,952 B2 * | 10/2012 | Wu | F04D 13/10 137/550 |
| 9,011,095 B2 * | 4/2015 | Parker | F04D 29/628 415/206 |
| 9,386,751 B2 | 7/2016 | Creekmore | |
| 9,622,421 B2 | 4/2017 | Babcock et al. | |
| 9,750,196 B2 | 9/2017 | Babcock et al. | |
| 9,854,745 B2 | 1/2018 | Babcock et al. | |
| 9,867,337 B2 | 1/2018 | Babcock et al. | |
| 2003/0091440 A1 * | 5/2003 | Patel | F04D 29/426 417/40 |
| 2004/0213823 A1 | 10/2004 | Stamets | |
| 2008/0155790 A1 | 7/2008 | Hsu | |
| 2008/0216397 A1 | 9/2008 | Busby et al. | |
| 2008/0313800 A1 | 12/2008 | Matsuda | |
| 2010/0303654 A1 * | 12/2010 | Petersen | F04B 35/06 417/423.7 |
| 2011/0143426 A1 | 6/2011 | Busby et al. | |
| 2011/0247970 A1 * | 10/2011 | Evingham | B01D 29/52 210/85 |
| 2012/0023709 A1 | 2/2012 | Hsu | |
| 2012/0148427 A1 * | 6/2012 | Irving | F04B 17/03 417/411 |
| 2012/0151821 A1 * | 6/2012 | Kovacs | A01M 1/106 43/107 |
| 2014/0098525 A1 * | 4/2014 | Bennett | H02J 7/00 320/135 |
| 2014/0322051 A1 * | 10/2014 | Bartl | F04B 9/14 417/544 |
| 2014/0341752 A1 * | 11/2014 | Gell, III | F04D 15/0218 417/44.1 |
| 2015/0000188 A1 | 1/2015 | Shirahane et al. | |
| 2015/0250103 A1 | 9/2015 | Babcock et al. | |
| 2015/0373920 A1 * | 12/2015 | Babcock | A01G 7/02 47/1.1 |
| 2017/0181381 A1 | 6/2017 | Babcock et al. | |
| 2017/0202153 A1 | 7/2017 | Babcock et al. | |

* cited by examiner

WATER MOVEMENT SYSTEM AND METHOD FOR CONTROLLING WATER BREEDING INSECT POPULATIONS

PRIORITY CLAIM

This application claims priority to U.S. provisional application 62/622,708, entitled "Water Movement System and Method for Controlling Water Breeding Insect Populations", filed on Jan. 26, 2018. This application also incorporates by reference the disclosures of U.S. application Ser. No. 13/032,324 filed on Feb. 22, 2011, U.S. application Ser. No. 14/725,220 filed on May 29, 2015, U.S. application Ser. No. 15/223,556 filed on Jul. 29, 2016, U.S. application Ser. No. 15/452,360 filed on Mar. 7, 2017, U.S. application Ser. No. 15/479,245 filed on Apr. 4, 2017, and U.S. application Ser. No. 15/954,438 filed on Apr. 16, 2018, as if fully set forth herein.

TECHNICAL FIELD

The present invention relates to a water movement system configured to eradicate and/or control insect populations, and more particularly, to a portable, solar water pump suitably configured to function in cooperation with a submersible carbon dioxide generator designed to act as an insect attractant for controlling insect populations.

BACKGROUND OF THE INVENTION

Many types of insects such as mosquitoes are known carriers of dangerous diseases including malaria, zika and West Nile virus. Controlling populations of troublesome insects like mosquitoes is of increasing concern to the health and safety of people.

The mosquito is found in every climatized corner of the globe and the deadly vector varieties put almost half of the world population at risk of infection every year. The mosquito is also a food source for birds, bats, frogs and fish, to name a few, and is an integral part of the cycle of life. Because mosquitoes are vectors for diseases, this means they can transmit diseases from one human or animal to another. Typically, the diseases are caused by viruses or tiny parasites. For example, a mosquito that bites an infected human or animal can pick up a virus along with the blood meal. The mosquito and virus do not harm one another but the virus reproduces inside the mosquito. Later, the mosquito can pass the viruses to other humans or animals when biting them.

There has been major research and development efforts around the world aimed at controlling mosquito populations because of the serious consequences inflicted on human beings. These efforts run the gamut from gene alteration to motorized suction fans with carbon dioxide attractants. Other methods employed for controlling this insect, such as aerial spraying, and fogging, often times have the undesirable consequence of eliminating many beneficial insects such as honey bees and butterflies or a variety of insects that are food sources for animals throughout the food chain, thus interrupting the natural order.

Regardless of the mosquito species, water or a moist surface is essential for breeding. The mosquito larvae prefer still water. All mosquitoes cultivate future generations through four stages of development—egg, larva, pupa, and adult. The larval and pupal stages are spent in water. This water is often stagnant and close to human dwellings. In fact, mosquitoes require very small amounts of standing water to lay their eggs.

Mosquito eggs can hatch in one to three days if laid on warm water. The larva lives in water but breathes air through a siphon. The siphon penetrates the water surface. Mosquito larvae feed on microorganisms and organic particles. The larvae mouth parts are modified into brushes which draw food into the mouth. Larva normally changes into a pupa in about a week.

The pupa stage lasts for one or two days. During this stage, the mosquito changes its life form from a larva that lives in water to a flying adult that lives in a terrestrial environment. The female mosquito seeks a blood meal necessary for egg development following mating. Without blood, mosquito eggs could not be produced. Mosquitoes select specific hosts from which to blood feed. Some mosquitoes feed on mammals, others only on birds.

In light of the shortcomings in the prior art, there clearly exists a need for an improved apparatus and method for eliminating insects such as mosquitoes that lay eggs in stagnant water sources.

SUMMARY OF THE INVENTION

The present invention eradicates and/or controls insects that lay eggs in stagnant water bodies by using an insect $CO_2$ attractant device to lure insects to lay their eggs within one or more pumping extermination zones or traps that includes an apparatus such as a solar water pump not detectable by the infrared capabilities of these insects during the egg laying process. This portable, solar-powered water pumping system is configured to function in cooperation with a submersible biological carbon dioxide device that is appropriately constructed to act as an insect attracting lure and trap.

The present invention relates to a new water movement system and method designed to eradicate and/or control mosquitoes or insects that lay eggs in stagnant water environments.

The present invention includes a water movement system suitably configured to function in cooperation with an underwater insect attractant device.

The present invention also includes a water movement system and method constructed to target and eradicate the adolescent stages of mosquitoes and/or other insects that lay their eggs in stagnant water environments.

In one embodiment, the biological attractant device is designed to emit carbon dioxide to attract insects, such as mosquitoes, to water bodies where they are predisposed to lay their eggs on the surface of the manufactured water extermination zone.

Another feature of the invention includes a water pump constructed to direct the flow of water from one or more water extermination zones to filters in order to entrap the eggs, larvae, or pupae of insects in order to kill them and help eradicate and/or control their populations.

A further feature of the invention is to generate $CO_2$ with a biological insect attractant device containing mycelia for generation of said $CO_2$ to attract and/or lure insects, such as mosquitoes, to lay their eggs on the surface of a water extermination zone or trap.

It is another feature of the present invention to provide a portable, solar-powered water pump suitably configured to move volumes of water from one or more water extermination zones or traps containing eggs, larvae or pupae of insects to filters for eradicating said insect populations in their pre-terrestrial life stages.

It is a further feature of the present invention to provide a solar-powered water pump that is easily assembled and disassembled without the need of tools according to a reliable, tight interference fit among its component parts allowing for easy cleaning and repairs thereof.

An additional aspect of the present invention is to provide a portable, solar-powered water pump that can be advantageously used to create a low cost, environmental friendly solution for eradicating insects that lay their eggs in water bodies, including, but not limited to: personal aquaponics, fountains, waterfalls, greywater systems, personal spring water, tank filling, rain water harvesting systems, ponds, streams, water troughs, creeks, reservoirs, lagoons, basins, bayous, blights, stream brooks, canals, channels, coves, deltas, estuaries, straits, inlets, fiords, gulfs, headlands, harbors, dams, kettles, kills, locks, swamps, marshes, moats, phytotelmas, rills, roadsteads, springs, tide pools, wetlands, ports, landscaping and/or outdoor water features, livestock watering devices, water tank filtration devices or waterways.

The present invention additionally provides a portable, solar-powered water pump device for eradicating insect populations in their infancy, pre-terrestrial life stages which includes parts coupled together comprising at least one pump having an intake chamber and an outflow nozzle; an output adapter coupled to the outflow nozzle to allow water that is being pumped from a source to be discharged therefrom; at least one remotely located solar energy panel electrically and/or communicatively coupled to the pump, by means of a solar panel connector, to allow the pump to run directly off the DC power generated from the solar panel to eliminate the need of an inverter; and a water-tight interference fit to allow the coupled parts of the solar-powered water pump to be advantageously assembled and disassembled without the need of tools.

A further aspect of the present invention is to provide a portable, solar-powered water pump configured to eradicate insect population in their pre-terrestrial life stages that utilizes at least one solar panel to convert sunlight to electricity for powering the pump.

The present invention also provides a water pump of practical design that is affordable, eco-friendly and compact enough for portable use.

The present invention additionally provides a solar-powered water pump which can be easily stored since it is configured to be quickly assembled and disassembled.

Another embodiment of the present invention provides a new, solar-powered water pumping system that has an output adapter coupled to the outflow nozzle of a pump to directly connect the solar-powered water pump to a plurality of plumbing fittings for advantageously pumping and/or moving water from one place to another. The various fittings include, but are not limited to, PVC fittings, PVC piping and polyethylene tubing, in which all aforementioned fittings having various radiuses depending on the size of the outflow nozzle of the pump.

A further feature of the present invention includes a portable, solar-powered water pump suitably configured to operate during the day and shut down at dusk to prevent mosquitoes and other insects from detecting the water pump at night with their infrared sensors.

In an alternative embodiment of the present invention, a non-fruiting mycelial fungus is used to generate or emit carbon dioxide for attracting and luring mosquitoes to lay their eggs on the surface of a water eradicating zone or trap.

The present invention also includes a device to deliver carbon dioxide in an underwater environment without the need of electricity or by means of compressed $CO_2$.

In a further embodiment of the present invention, the biological insect attractant device is comprised of a container containing a mycelial mass, mycelia with a food substrate, or bacteria with comparable properties.

The insect attractant device further includes an exit portal for $CO_2$ to enter the underwater environment and said portal may include nothing more than the existing breather patch.

In another embodiment, the insect attractant device is comprised of one double-lined, double-filtered bag with at least two filters, the filters preferably facing in opposite directions. If two stand-alone bags are joined to create this embodiment, then three seals may be required to seal the device. The first seal closes the doubled-lined bag on the bottom, the second seal closes the top of the inner liner bag and the third seal closes the top of the outer lining of the outer bag.

The insect attractant device further comprises a separation device in order to provide selective sealing and to selectively delay and control the flow of $CO_2$. The device also comprises a securing component to hold the carbon dioxide supplementation system in place in the underwater environment. The device can be used alone or in conjunction with an outer shell to house the container. Such an external shell advantageously segregates or disguises the device for protection and/or for aesthetic purposes.

The insect attractant device can also be used to create carbon dioxide in an underwater environment for attracting insects, such as mosquitoes, prone to laying their eggs in a stagnant water environment. The intended attraction activities are a means by which humans can manipulate these insects for the purposes of trapping and killing the insects' eggs and thereby better controlling insect populations which in turn curbs the spread of blood-borne diseases.

In another embodiment of the present invention, the insect attractant device can be used to assist in luring flying insects towards a body of water where they will lay their eggs. In this embodiment, the treated water body (i.e., supplemented carbon dioxide in the water) is serving as a trap where any eggs laid will be destroyed and/or controlled. One mode by which such destruction occurs is by water circulation created by one or more solar-powered water pumps having at least one filter. In essence, the treated water body is serving as a trap where any eggs laid will be destroyed and/or controlled such as by water circulation with the aid of the solar-powered water pump and therefore any insect progeny disposed under the water will be drowned or eradicated when collected by the filters of the pump. The supplemented carbon dioxide, similar to the $CO_2$ in human breath, attracts the insects.

Consequently, for a better understanding of the present invention, its functional advantages and the specific objects attained by its uses, reference should be made to the accompanying drawings, claims and descriptive matter in which there are illustrated preferred embodiments of the invention.

DETAILED DESCRIPTION OF THE INVENTION

Introduction

The following detailed description is of the best currently contemplated modes of carrying out various embodiments of the invention in which said embodiments can be carried out independently and/or in combination. The description is not to be taken in a limiting sense, but is made for at least the purpose of illustrating the general principles of the invention, since the scope of the invention is best defined by the appended claims.

In one embodiment of the present invention, one or more water movement systems are provided for eradicating and/or controlling insect populations. The water movement system is comprised of a water pump configured to function in cooperation with one or more underwater insect attractant devices; the insect attractant device is configured to generate carbon dioxide in an area that stores water for luring insects to lay their eggs on the surface of a water extermination zone or trap, the extermination zone or trap containing the eggs, larvae or pupae from said insects; and the water pump is advantageously configured to control insect populations by directing the flow of water from the water extermination zone or trap containing the eggs, the larvae or the pupae of said insects to the filters of the pump.

In another embodiment of the present invention, a method is provided for eradicating and/or controlling insect populations. The method comprises the steps of: forming a water extermination zone or trap by generating carbon dioxide in an area that stores water; attracting insects that lay eggs in water or moist environments to the water extermination zone or trap via the $CO_2$ generation for luring said insects to lay their eggs on the surface of the water extermination zone or trap; at a time apart from the egg-laying times, pumping the water containing the eggs, larvae or pupae of the insects with a water pump; and eradicating and/or controlling said insect populations by pumping the water containing the eggs, larvae or pupae to the filters of the water pump.

Detailed Description

Figure 1:
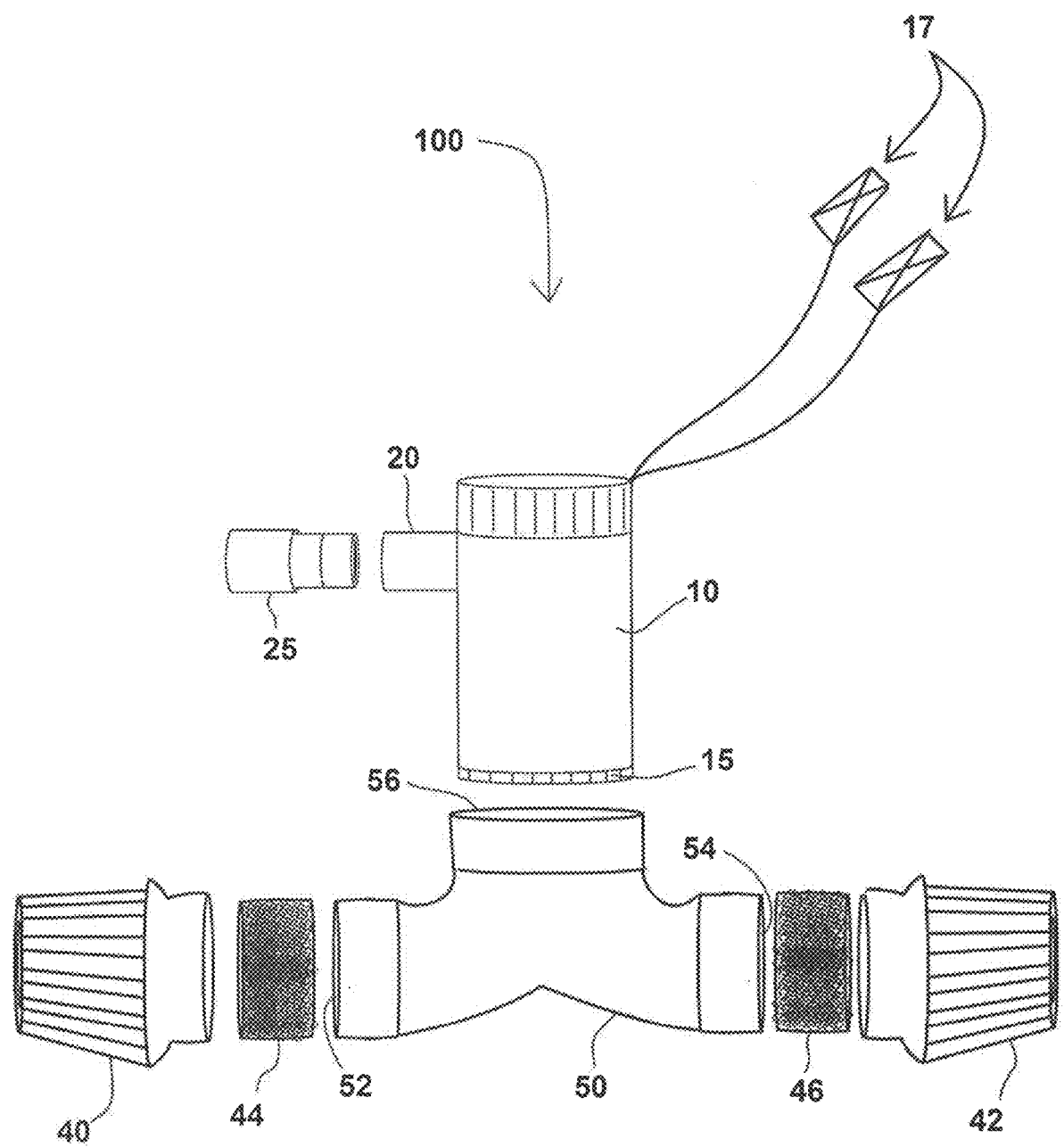
FIG. 1 is a front view of one embodiment of the solar-powered pump in a disassembled state.
Figure 2:
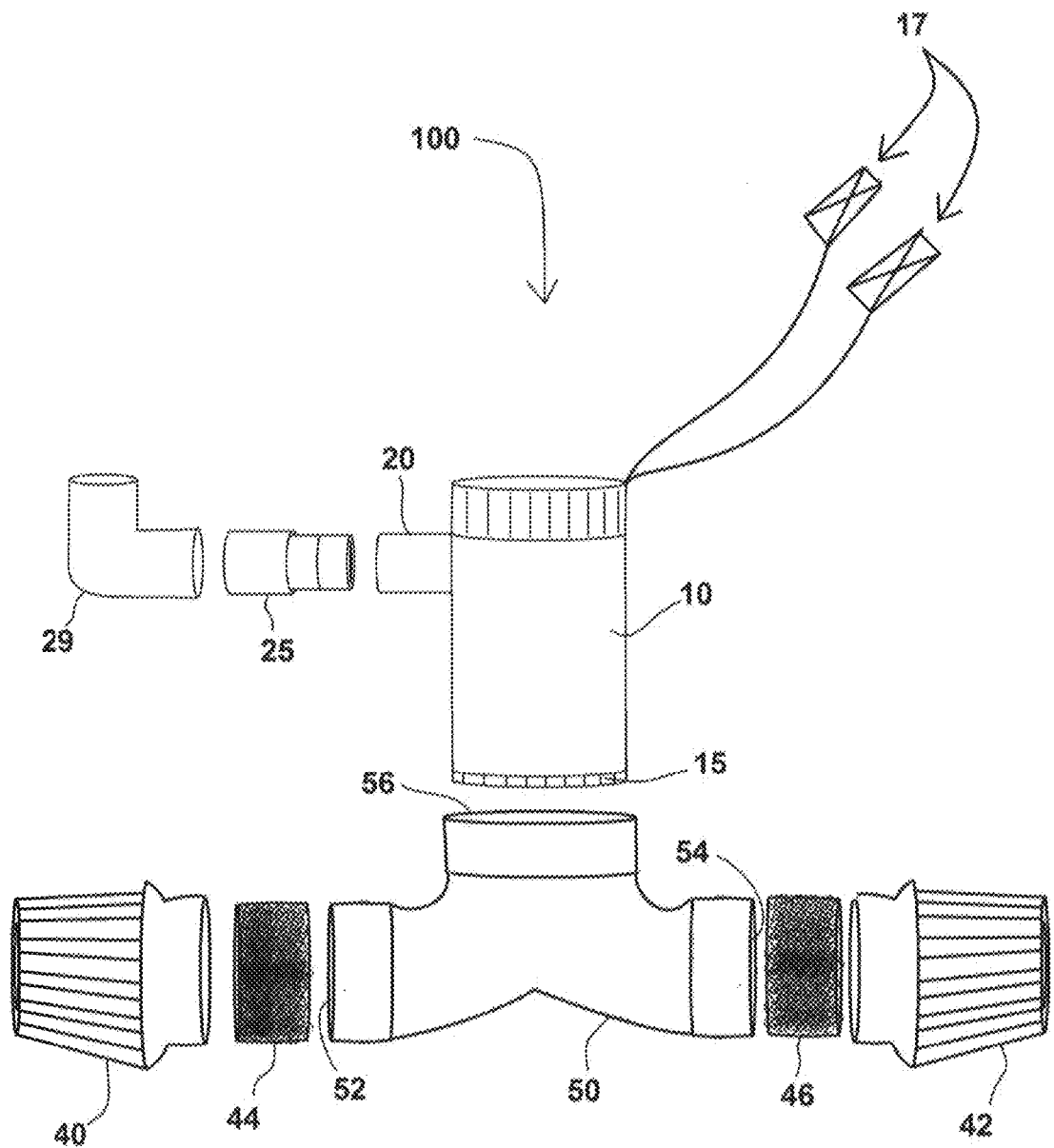
FIG. 2 is a front view of one embodiment of the solar-powered water pump in a disassembled state and having an optional fitting connector for connecting to a discharge output adapter.

Referring now to the drawings, FIGS. 1 and 2 refer to one embodiment of the invention depicting the portable solar-powered water pumping device 100 in a disassembled state. The portable solar-powered water pumping device 100 includes a pump/pump housing 10 having an intake chamber 15 and outflow nozzle 20. The intake chamber 15 provides a means for drawing in water. The outflow nozzle 20 allows the water that is being drawn in by the pumping device 100 to be discharged to the filters of at least one pump or to an area selected by a user configured to eradicate and/or control insect populations.

Referring still to FIGS. 1 and 2, a drain vent fitting 50 is illustrated having a first end 56, a second end 52 and a third end 54. The first end 56 is connected to the intake chamber 15 by means of a water-tight interference fit. A first atrium grate 40 is connected to the second end 52 of the drain vent fitting 50 by a water-tight interference fit. A first filter 44 is enclosed within the first atrium grate 40 and the second end of the drain vent fitting 52 for filtering and entrapping insect eggs, larvae or pupae from water that is being pumped out of a location. One embodiment of the invention uses a MATALA brand filter, typically a black or green filter for trapping medium size particles. The MATALA brand filters clean easily by either shaking the debris out or by using a garden hose to spray them clean.

A second atrium grate 42 is coupled to the third end of the drain vent fitting 54 by the water-tight interference fit as shown in FIGS. 1-2. A second filter 46 is enclosed within the second atrium grate 42 and the third end of the drain vent fitting 54 for filtering and entrapping insect eggs, larvae or pupae from water that is being pumped out of a location. The illustrative embodiment of the invention uses a MATALA brand filter for the second filter 46 as well as the first filter 44, both trapping medium size particles. Other filter densities will be beneficial in certain applications. An output adapter 25 is beneficially coupled to the water outflow nozzle 20 by the tight interference fit to allow the water that is being pumped from a location to be discharged to an area selected by the user for insect control. Importantly, an output adapter 25 is not customarily used or coupled to the outflow nozzle 20 of a bilge pump 10—an important adaptation that allows the pump 10 to be more versatile since it can now be advantageously connected to three separate connectors and/or fittings 29 such as an ID bonds over ½" PVC pipe, an OD bonds into ¾" PVC socket or a w/A 700 tubing (½" tubing) (See FIG. 2).

Figure 7:
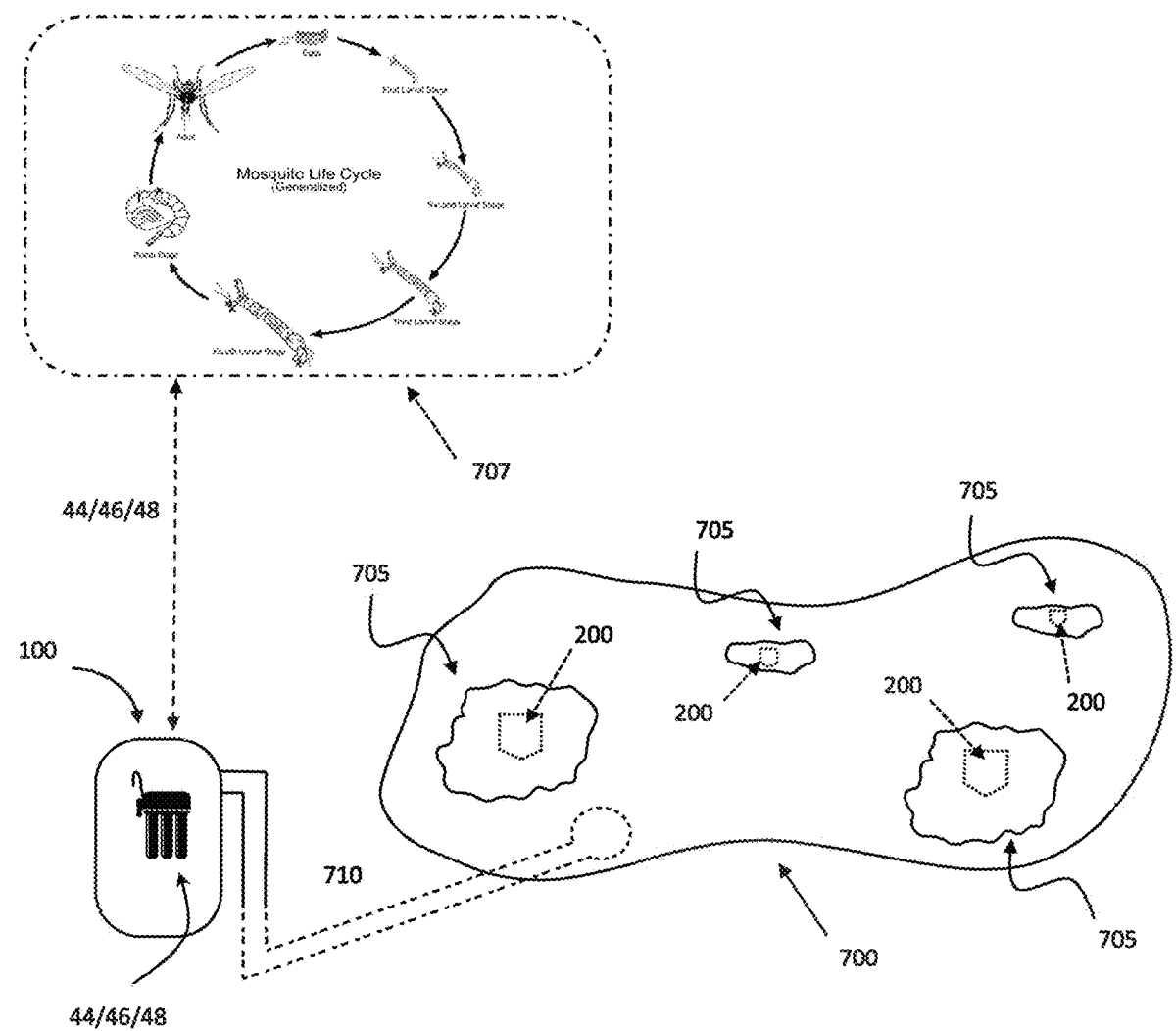
FIG. 7 schematically represents the system in use for eradicating and/or controlling mosquito populations or other insect populations that lay their eggs in stagnant water environments. The content shown in the broken lines is for illustrative purposes only and does not form any part of the claimed invention.

Optionally, a third filter 48 (FIG. 7) can be fitted and enclosed in the middle of the drain vent fitting 50 for filtering the water that is being pumped out of a location such as a water extermination zone or trap 705 as illustrated in FIGS. 7 and 8.

In this disclosure, the terms "second end" and "third end" refer to, but are not limited to, the at least one intake end. Also, the term "first end" refers to, but is not limited to, coupling end. Moreover, while two intake ends are shown, more than two intakes can be used. In certain applications only one intake may be needed. Accordingly, it is anticipated in this disclosure that the discharge output adapter may have one coupling end, previously referred to as the first end, and any number of intake ends, previously referred to as the second and third ends.

In an alternative embodiment, drain vent fitting 50 has a coupling end, connected to the intake chamber 15 by means of a water-tight interference fit (e.g. see FIG. 2). Drain vent fitting 50 additionally has at least one intake end. Furthermore, an atrium grate can be attached to each of the intake ends of drain vent fitting 50. The atrium grates may be attached to each intake end through a tight interference fit. A filter may also be inserted, enclosed within the tight interference fit between each atrium grate and the intake ends.

Figure 3:
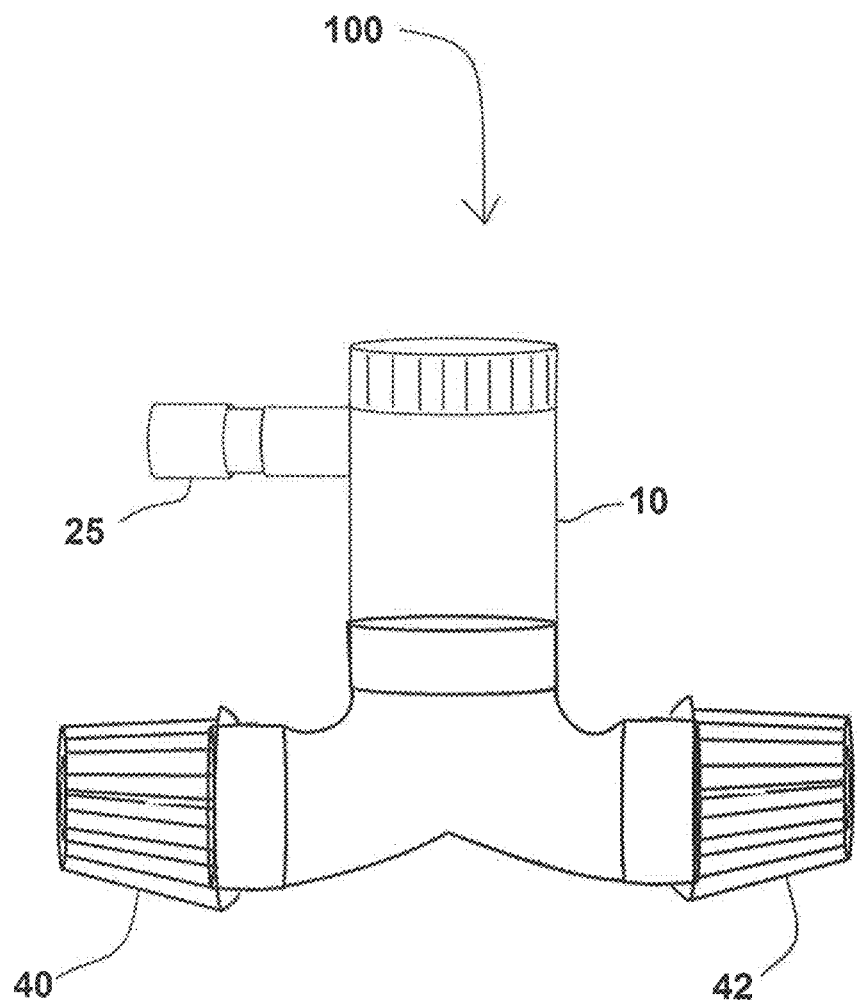
FIG. 3 is a front view of the solar-powered water pump in an assembled state.
Figure 4:
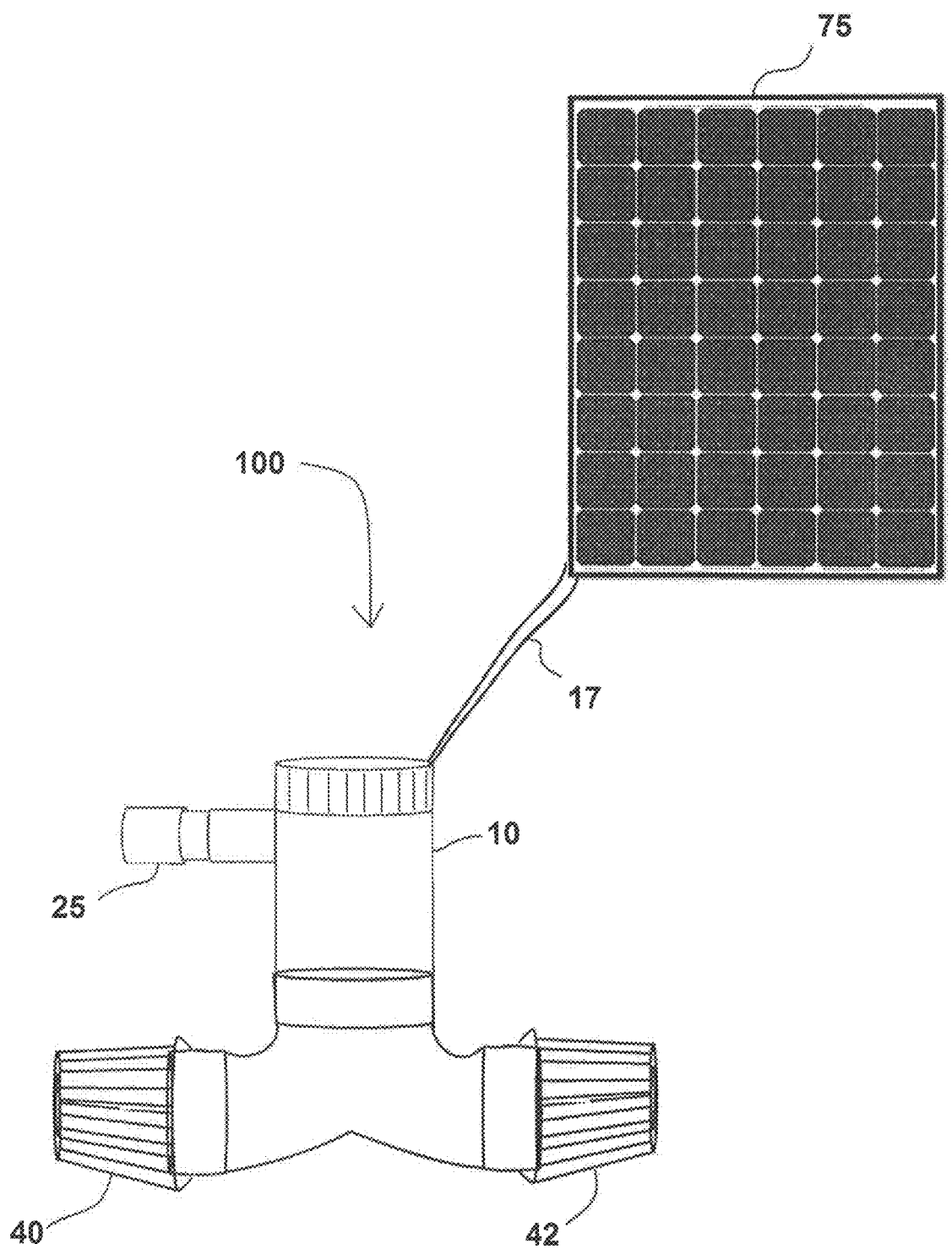
FIG. 4 is a front view of one embodiment of the solar-powered water pumping system in an assembled state and connected to a solar energy panel.

The water-tight interference fit (also known as tight interference fit) provides a sufficiently tight seal for keeping the plurality of plumbing parts securely connected to each other. As shown in FIGS. 3-4, the plurality of plumbing parts comprising the solar-powered water pumping device/system 100 are fully assembled (also referred to as a kit and/or kit assembly) and securely held together by the water-tight interference fit. Additionally, the water-tight interference fit is configured to allow the solar-powered water pump/system to be assembled and disassembled among its component parts, by hand, without the need of tools as illustrated in FIGS. 1-4.

As shown in FIGS. 1-2, the solar-powered water pump includes MC4 connectors 17 for connecting the water pumping device/system 100 to at least one solar energy panel 75 as illustrated in FIG. 4. Optionally, the MC4 connectors 17, also called MC4s are single-contact electrical connectors commonly used for connecting solar energy panels. MC4s allow strings of energy panels to be easily constructed/assembled by pushing the connectors from adjacent panels together by hand but require a tool to disconnect them to ensure they do not accidentally disconnect when the cables are pulled.

Alternatively, one embodiment of the invention provides a new solar water pumping device/system 100 having a discharge output adapter 25 connected to the water outflow nozzle 20 of the pump 10 or bilge pump 10 to allow the solar water pumping device/system 100 to be directly connected to various fittings 29 for pumping and/or moving water from one place to another as depicted in FIG. 2. The various and optional fittings 29 include, but are not limited to, PVC fittings, PVC piping and polyethylene tubing, in which all aforementioned fittings having various radiuses depending on the size of the outflow nozzle 20 of the pump 10. For example, the output fitting 25 could be connected to a ¾" pipe fitting, ½" PVC pipe or a ⅝" polyethylene tube. An optional PVC pipe elbow fitting 29 is illustrated in FIG. 2, which is coupled to discharge output adapter 25 for allowing water to be discharged to a location designated by the user. For example, the water can be directed to a bucket, container, or basin for treating said water in order to eradicate the eggs, larvae or the pupae 707 for insect population control which could eliminate the need for filters.

A further embodiment of the invention includes at least one monocrystalline solar pv panel. The optional parameters of the panel are: maximum power: 60 watts; output tolerance: +/−1%; vmp: 18.2 volts; Imp: 3.3 amps; Voc: 22.2 volts; Isc: 3.6 amps; maximum system voltage: 1000 volts; fuse rating max.: 15 amps; weight:/tank 15 Kg; and dimensions of 630 mm (H)×670 mm (L)×30 mm (W).

Figure 5:
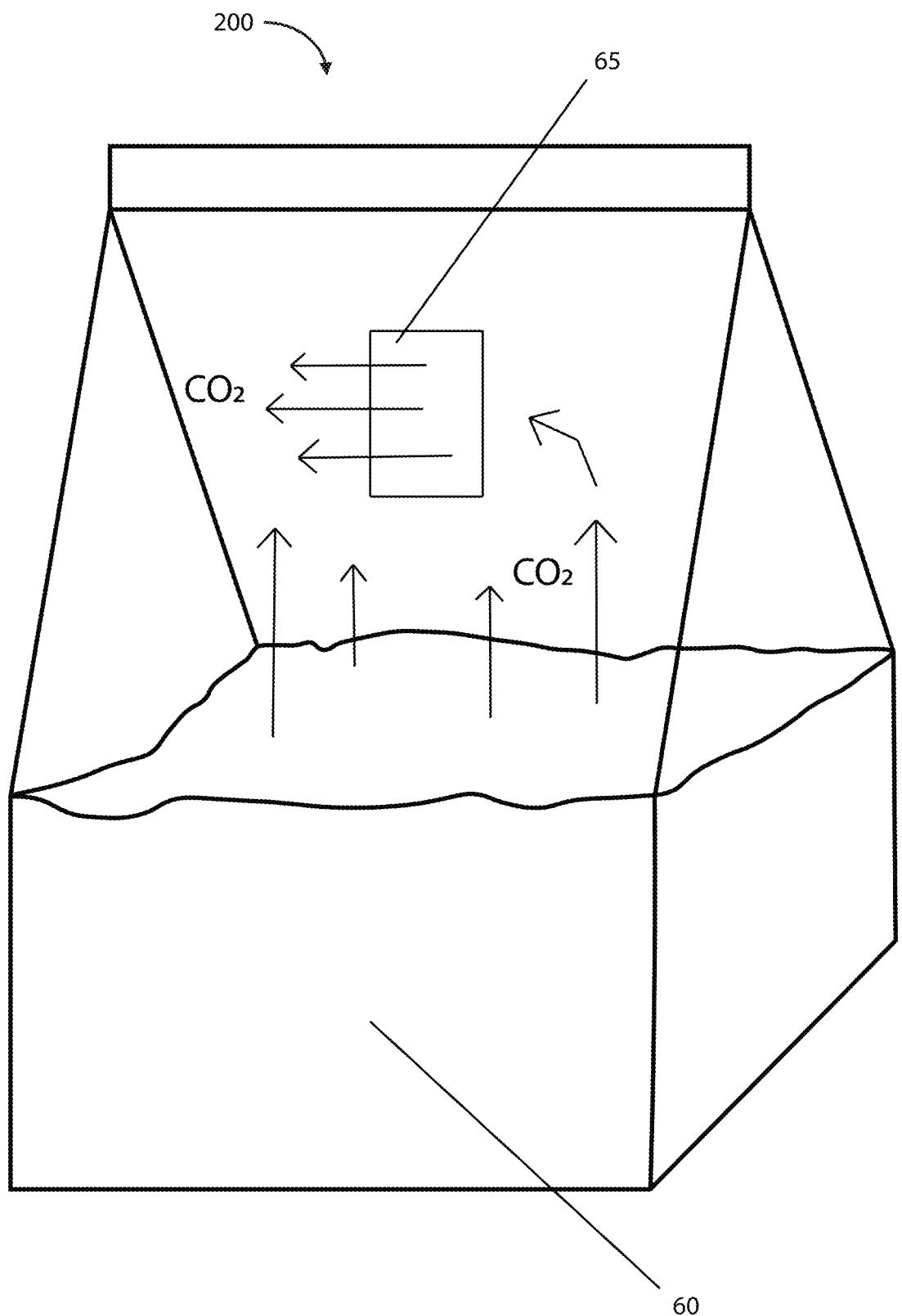
FIG. 5 shows one embodiment of the insect attractant device.
Figure 6:
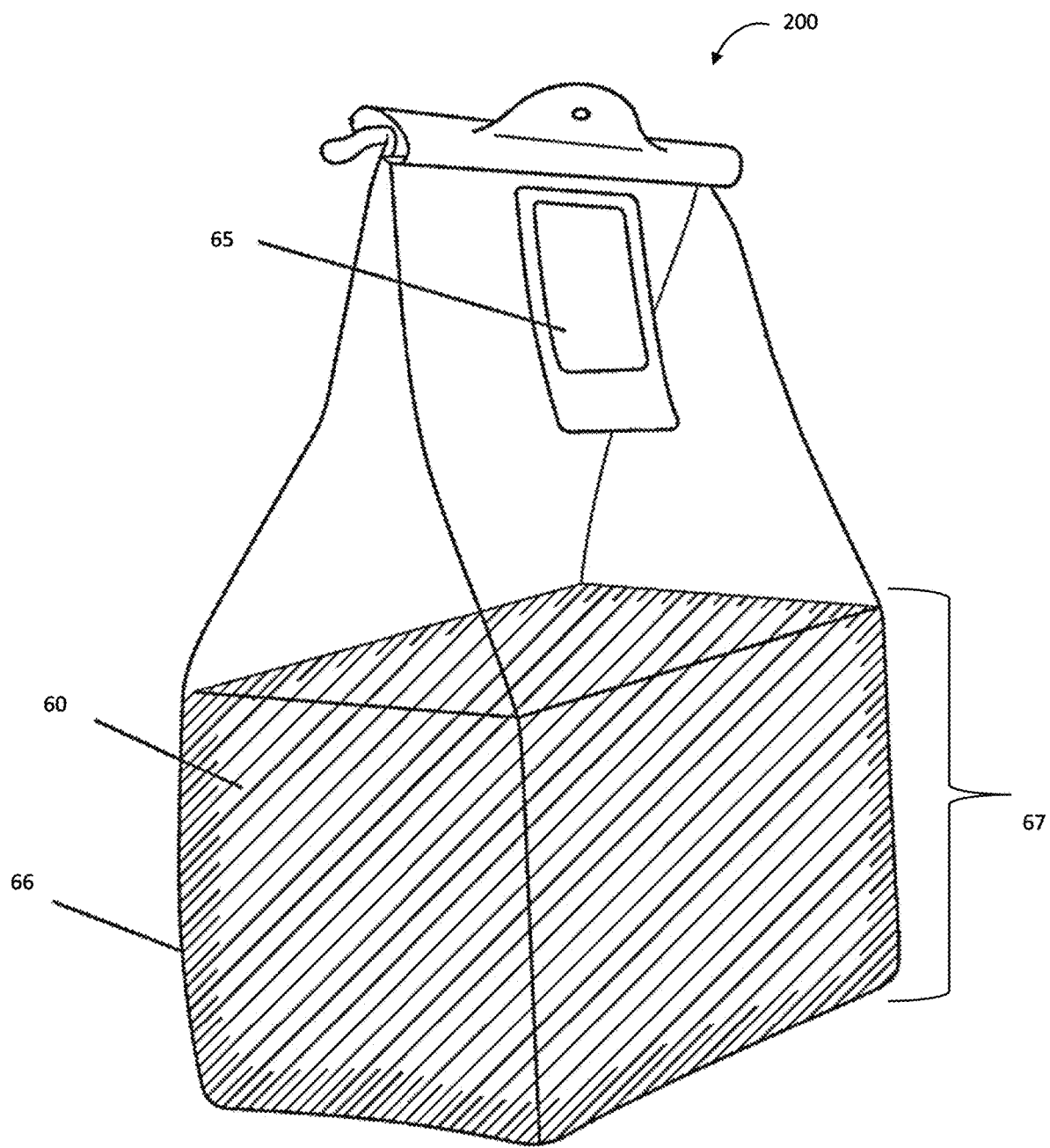
FIG. 6 shows another embodiment of the insect attractant device.
Figure 8A:
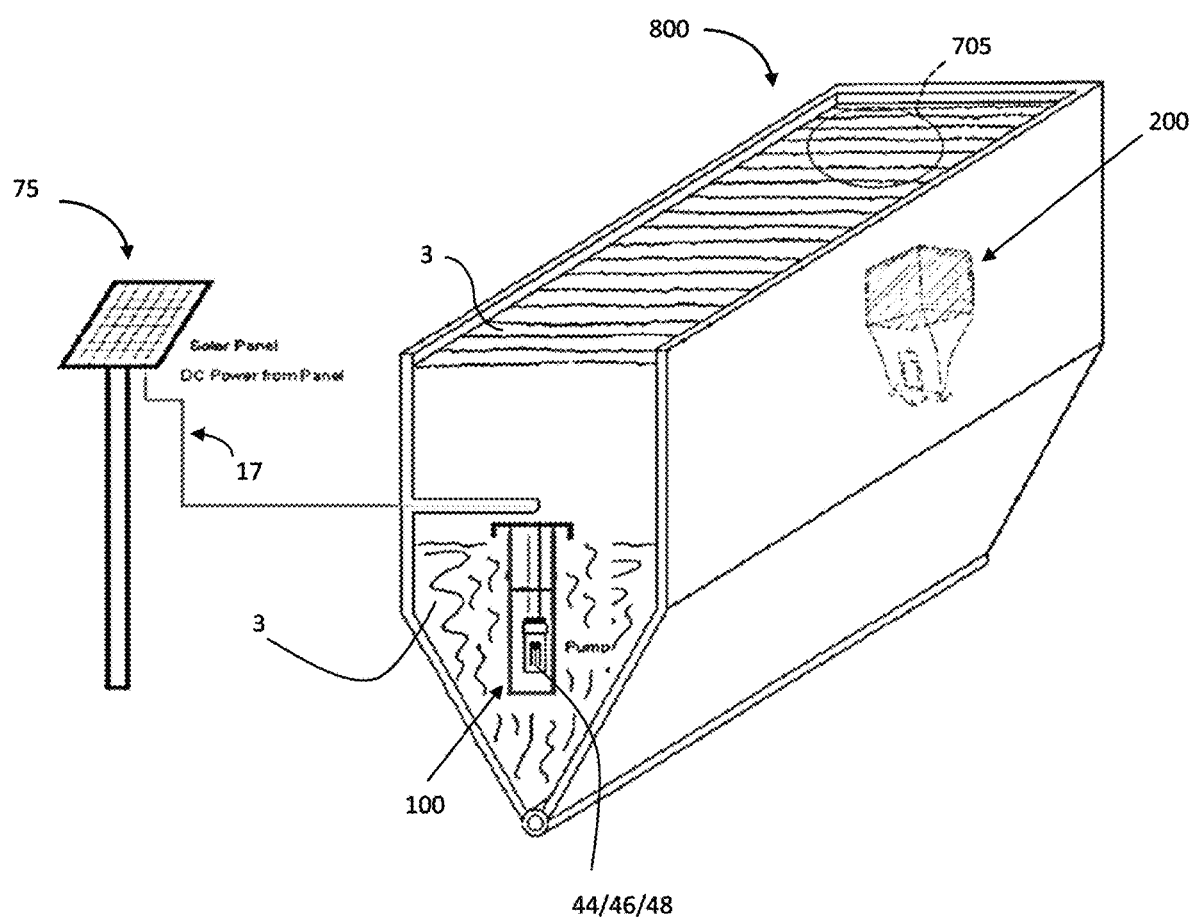
FIGS. 8A and 8B are additional schematic depictions of the present invention in use for eradicating and/or controlling insect populations that lay their eggs in stagnant water environments such as in a trough FIG. 8A and/or water fountain FIG. 8B.

FIGS. 5 and 6 refer to one embodiment of the present invention depicting the underwater biological insect attractant devices 200 configured to hold organisms such as mycelia 60. Each of the devices 200 will include at least one breather patch 65, also referred to as a gaseous interchange portal. The breather patch 65 is comprised of a microbial filter which allows oxygen to enter the bag and carbon dioxide to leave the bag even if the bag is underwater. The breather patch 65 will allow oxygen to enter the bag and carbon dioxide to leave the bag even if the patch 65 is located below the level of the mycelia 60 in the container such as shown in FIG. 8A. In this disclosure, the device 200 can be comprised of a capsule, a hard cover container/case, at least one soft cover such as one or more plastic bags, or a combination or aspects of each.

Alternately, one embodiment is comprised of a soft-shelled bladder 203 holding a mass of beneficial organisms and food 67, an external shell 201 for receiving and protecting the soft-shelled bladder 203, a minimum of one gaseous interchange portal 65 between the body of water and the mass of organisms and food. The gaseous interchange portal 65 prevents water from reaching the organisms and the food. Optionally, the organisms are mycelia 60 of the white rot variety or of the Turkey Tail fungus strain. The gaseous interchange portal 65 preferably occurs on the soft-shelled bladder. In this disclosure, the mycelia 60 is comprised of organisms and food.

Figure 10:
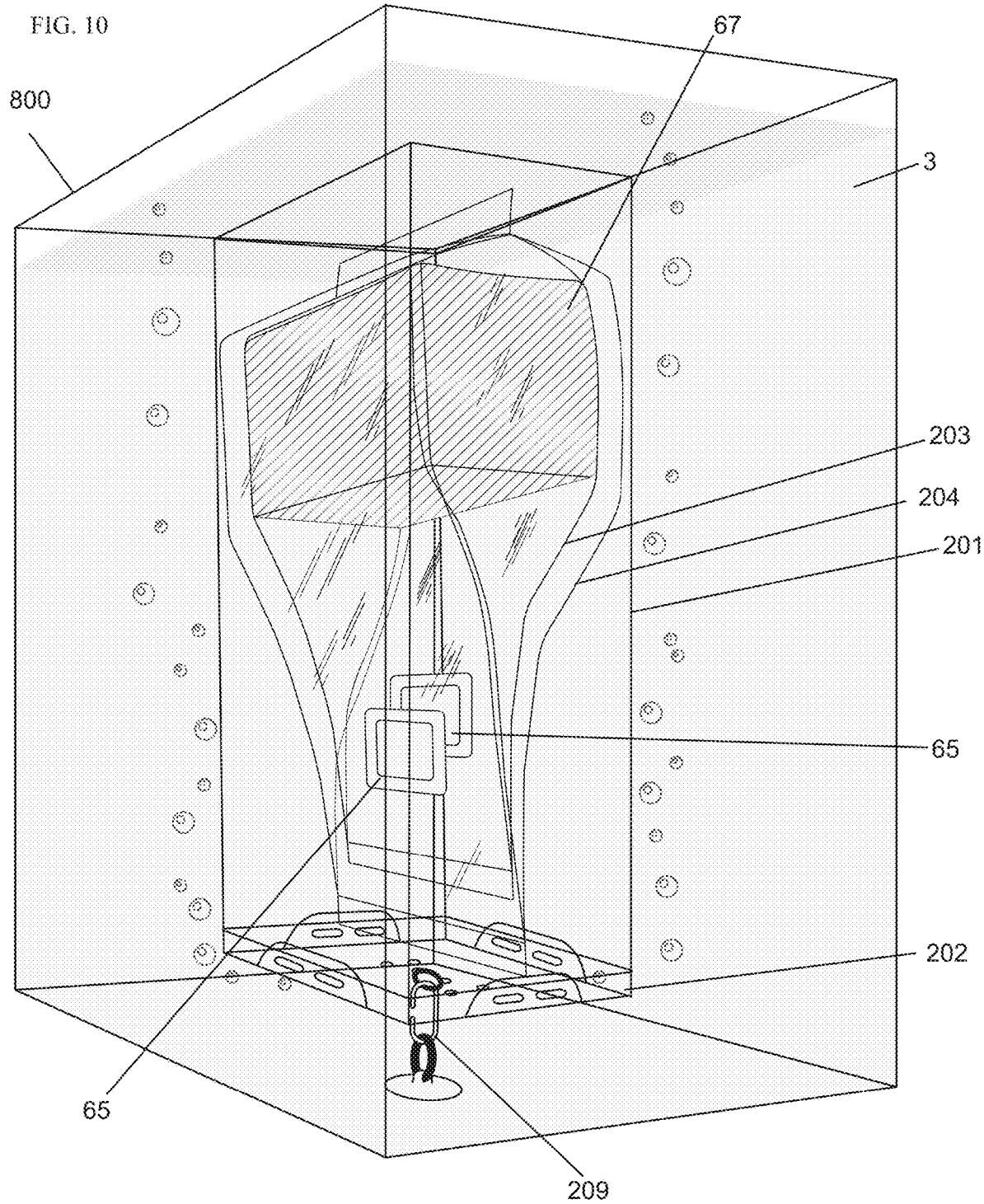
FIG. 10 is a perspective view of one embodiment of the insect attractant device of the present invention where a double bag soft bladder is inserted into an external shell, for example a hard-shell case and installed in an underwater environment.

In the external shell variations, single or double bag embodiments may be utilized as the soft bladder, but the device still includes a minimum of one gaseous interchange portal between a body of water and the respirating mass preventing water from reaching the respirating mass. The organism and food 67 must stay dry to avoid contamination and organism death. FIG. 10, shows an external-shell variation of the insect attractant with a double bag embodiment 203/204 is inserted into an external shell 201 with a lid 202. Although not separately illustrated, the hard-shell container 201 shown in FIG. 10 may also accept a single bladder or bag like the one shown in FIG. 6. FIG. 10 further shows the insect attractant device 200 installed in an underwater setting with water 3 is expressed by the gray shading in the transparent reservoir 800 and bubbles depict the movement of carbon dioxide from the insect attractant device 200 toward the water surface where it will be expelled to the atmosphere. In FIG. 10, the external-shell 201 is transparent to show the contents within but it could also be opaque or aesthetically conceal the placement underwater. In the simplest of embodiments, the hard case functionality could be provided by a bucket placed over top of the bag before the combination is placed in water.

Figure 11:
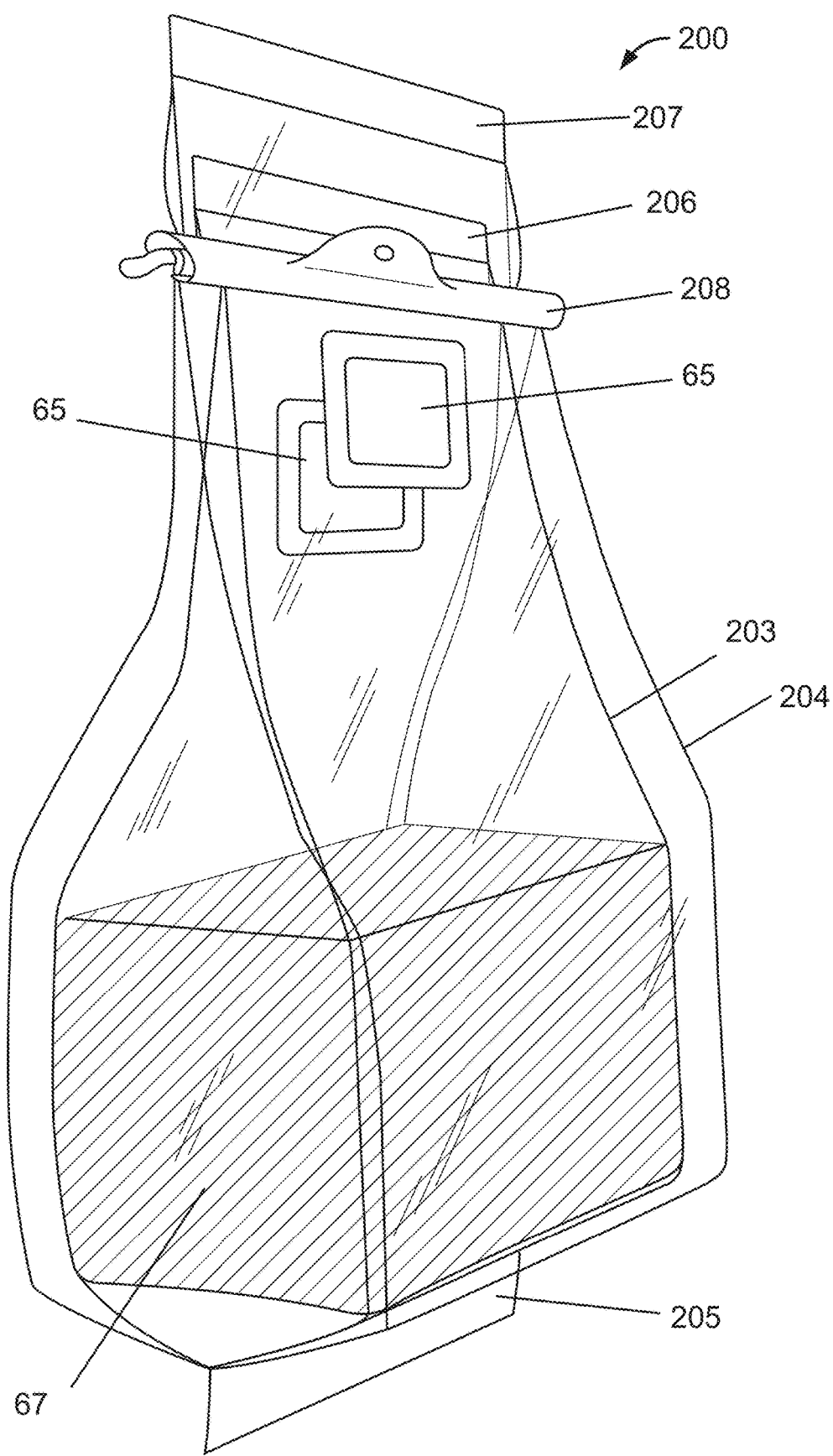
FIG. 11 is a perspective view of an example of a double bag container of the insect attractant device.
Figure 12:
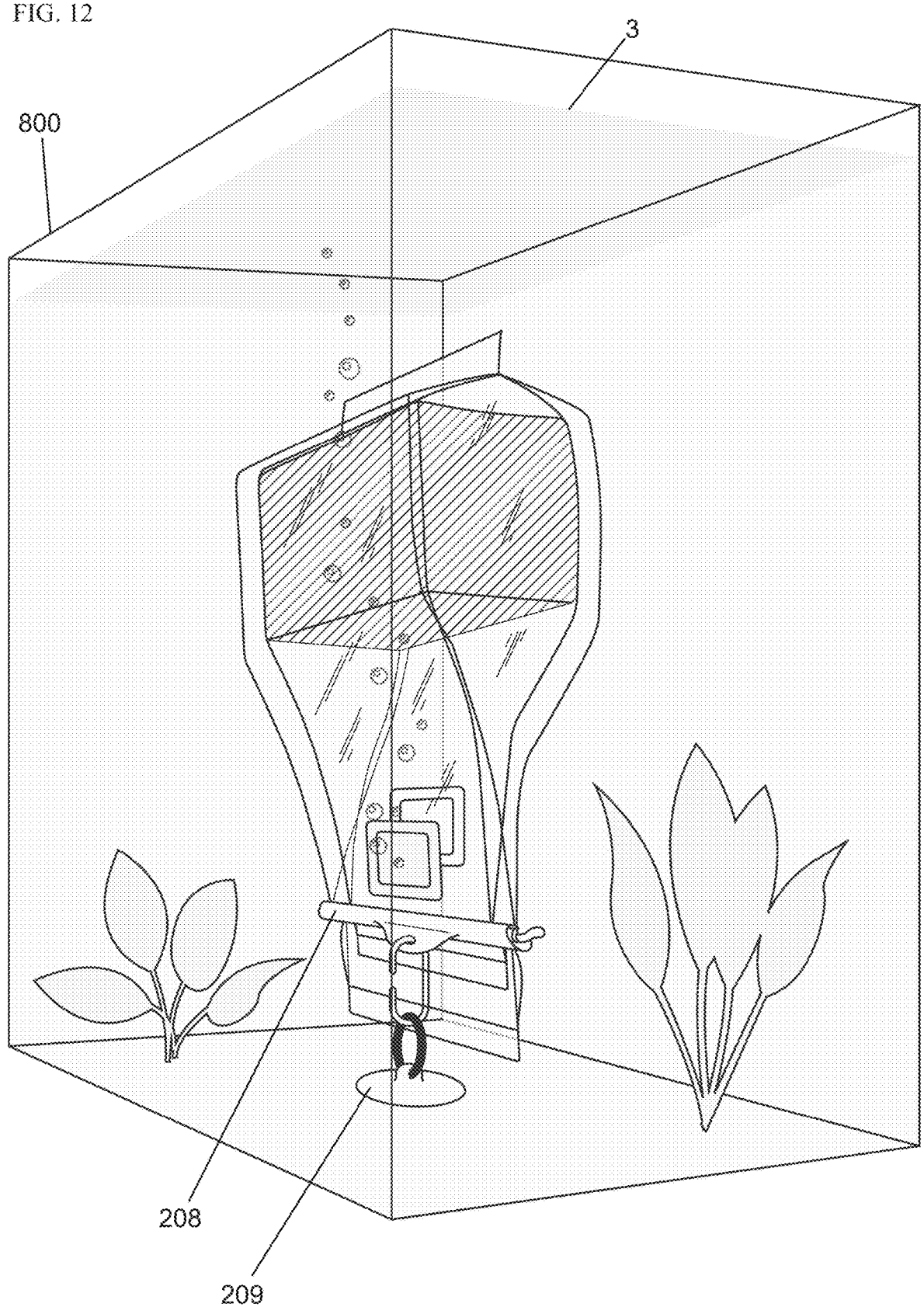
FIG. 12 is a perspective view of a double bag embodiment of the insect attractant device installed in an aquarium as an example of an underwater environment.

In another embodiment shown in FIG. 11, the insect attractant device 200 is comprised of one double-lined, double-filtered bag 203/204 with at least two filters 65, the filters 65 preferably facing in opposite directions but could be facing the same direction. If two stand-alone bags are joined to create this embodiment, then three seals may be required to seal the device. The first seal 205 closes the doubled-lined bag on the bottom connecting each bag 203 and 204 to one another with a single joint seal, the second seal 206 closes the top of the inner liner bag 203 and the third seal 207 closes the top of the outer lining 204 of the outer bag. Here the insect attractant device 200 is shown outside of the water environment but it would be installed underwater as shown in FIG. 12 using clip 208 and an anchoring method 209 to keep the breather patch 65 below the water surface. The use of the hard-shell container shown in FIG. 10 or the double bag container in FIGS. 11 and 12 will provide extra insurance against water penetration due to bag deterioration in adverse water conditions.

Figure 8B:
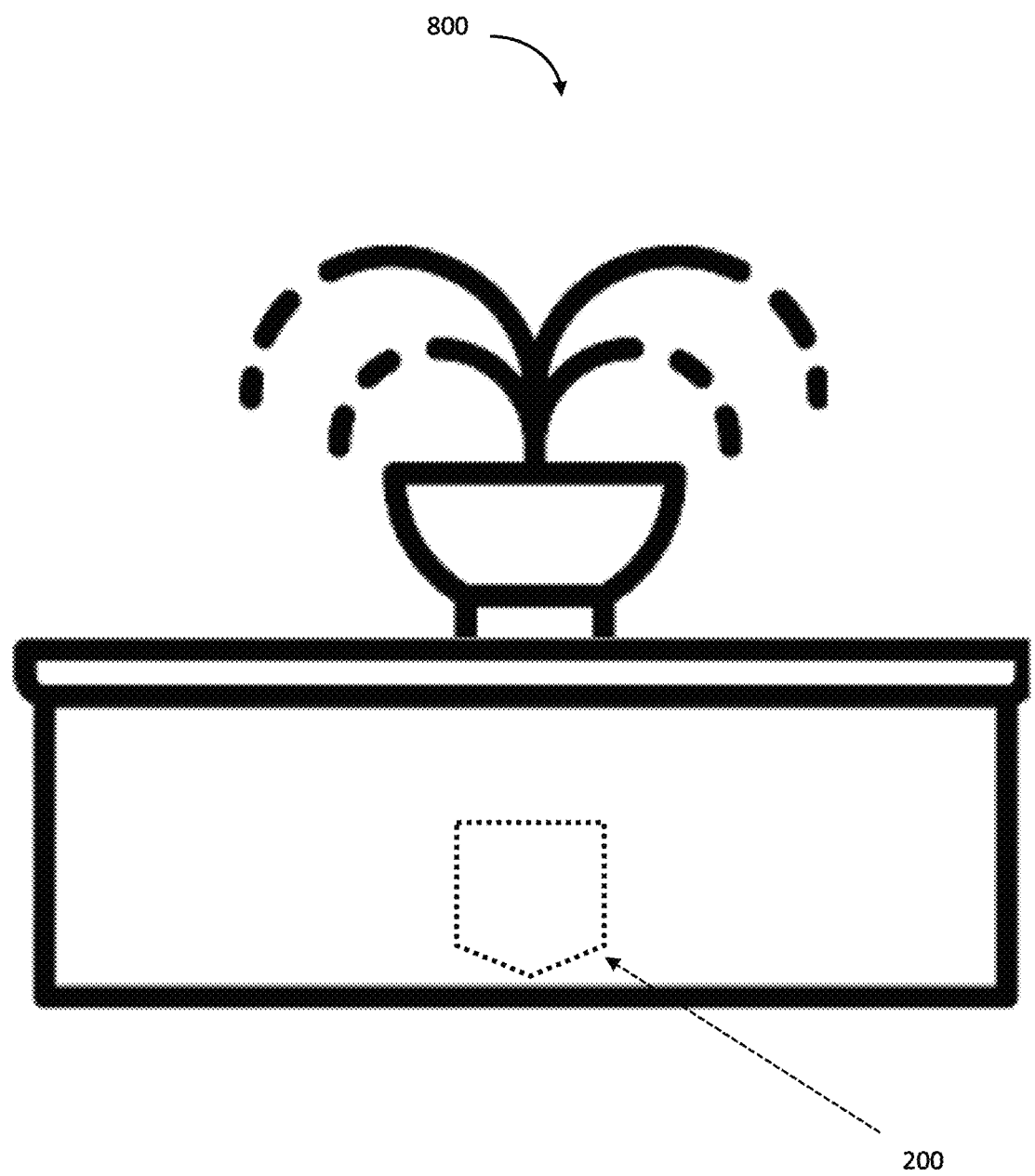

In the present invention, positioning the breather patch 65 below the level of mycelia 60 is preferred because the mycelia 60 and food source in the container will float. The suspension of the mycelia 60 above the level of the patch 65 will enhance the ability of the heavier carbon dioxide molecules to fall or sink and escape through the breather patch. The benefits of the device 200 are still realized even if the mycelia mass 60 are placed below the breather patch in the container 200. In use, the device/container/bladder 200 will be anchored in a water reservoir or holding device as represented in FIGS. 8A and 8B. One anchor example 209 of a suction cup and c-hook is shown in FIGS. 10 and 12 but in environments where a suction cup may not function other known tie-down methods, such as weights, anchors, screws, cable ties or arms must be employed to secure the device underwater. The sealed container 200 inclusive of the breather patch 65 of the present invention does not allow the contents of the bag 200 to get wet. Water molecules are too large to cross the filter and are therefore excluded from crossing the filters of the patch and from entering the container 200.

Each embodiment of the present invention provides an all-natural solution of generating carbon dioxide that does not require regulators or the use of electricity. The present invention also advantageously generates enough $CO_2$ for the entire duration of the mosquito season, requires no mixing or maintenance and poses no fire danger.

In another embodiment, the $CO_2$ delivery device 200 is advantageously installed with a water movement system to supplement carbon dioxide in an underwater environment by an attachment mechanism. As illustrated in FIG. 6, the underwater carbon dioxide delivery device/container 200 will be comprised of a sealed container, an organism 60 contained within the sealed container, a beneficial food substrate 66 to feed the organisms and the mixture 67 of the food with the organisms in the sealed container, a breather patch 65 located on the sealed container, the breather patch having sufficient filtering capabilities to allow carbon dioxide molecules to leave the sealed container and oxygen molecules to enter the sealed container, the breather patch having sufficient filter capabilities to prevent whole water molecules from entering the sealed container, and an attachment mechanism as depicted in FIG. 6.

As the organisms 60 carries on its respiration, carbon dioxide leaves the sealed container 200, and flows into the water reservoir/source 700/800 (see FIGS. 7, 8A, 8B). The organism survives in the protected environment of the container 200 and results in the exhaling of carbon dioxide from the organism and then from the gaseous exchange portal 65 of the sealed bag/container. While the product is utilizing natural processes, those natural processes are being used in alien environments and being specially protected and treated to optimize $CO_2$ production. Respirating organisms such as mycelia typically do not survive underwater. Food substrates for those organisms do not naturally remain dry when submerged. The present invention is the result of naturally occurring respiration processes for providing a delivery device and system to supplement $CO_2$ in an underwater environment without the need of electricity. It is vital that the gaseous interchange portal allow for the exit of $CO_2$ into the underwater environment. The release of the carbon dioxide in a water environment can assist in attracting insects such as mosquitoes to lay their eggs in the water extermination zone 705.

In a further embodiment, an ExHale® brand bag is used for the present invention. The ExHale® brand bag includes a special mixture of mycelia and a food substrate for that mycelia. In the ExHale® brand bags, the mycelia are provided with all the food required to feed their survival for up to 6 months, the duration of the mosquito breeding season in most climates. In addition to food, mycelia require oxygen to survive. Even when the bag is placed underwater, mycelia can access the oxygen needed to survive through the breather patch 65. Optionally, mycelial respiration is assisted if the water is circulated at least once a day.

In one embodiment, the present invention is suitably configured to be applied to still bodies of water in order to prevent the breeding and birthing of disease bearing mosquitos. Because the present invention is solar-powered, the solar-powered pump is naturally designed to disengage in the evening and night, coinciding with the period in which female mosquitos are most active. The body of water to which the present invention is applied will appear to be still-water during the night, and will attract mosquitos to breed. During the sunlight hours, the solar-powered pump will be reengaged, and any spawned mosquito eggs or larva will be destroyed in the pump mechanisms or any added filters by drowning or suffocating those life forms as they are trapped underwater.

In use, one or more water movement systems 700/800 are suitably configured to eradicate and/or control insect populations (see FIGS. 7, 8A, 8B). The systems 700/800 are comprised of one or more water pumping devices 100 configured to function in cooperation with one or more underwater insect attractant devices 200 as particularly shown in FIGS. 8A and 8B. Although not shown, the system of FIG. 8B includes all the same components shown in FIG. 8A (i.e., water pump 100, filters 44/46/48, insect attractant device 200, solar panel 75, and at least one extermination zone 705). The insect attractant device 200 is also suitably constructed to generate carbon dioxide in an area that stores water for luring insects to lay their eggs on the surface of the water extermination zone or trap 705 as illustrated in FIG. 7 and FIGS. 8A and 8B.

In an additional embodiment, the water pumping device 100 is portable, solar-powered and includes a plurality of plumbing parts having a water-tight interference fit. The plumbing parts are configured to be manually coupled and uncoupled without the need of tools for use in many types of environments to combat mosquito and other insect type breeding in still water.

In use, there can be one or more extermination zones 705 containing the eggs, larvae or pupae 707 from said insects as shown in FIG. 7. The insect species shown in the broken lines 707 are for illustrative purposes only and are not part of the claimed invention. The water pumping device 100 is also suitably configured to direct the flow of water 3 pumped from the water extermination zone or trap 705 containing the eggs, larvae or the pupae 707 of said insects to the filters 44/46/48 of the pumping device 100, thereby enabling said insect populations to be eradicated by said filters (see also FIGS. 7, 8A, 8B). Optionally, the eggs, larvae or the pupae 707 of said insects can be directed to a specific location or device other than filters for eradication and/or control of said insect populations.

In use, the water pumping device 100 will cause the eggs, larvae or pupae 707 to traverse from the extermination zone or trap 705 by the movement of the water 3 which will cause said eggs, larvae or pupae to be drowned and/or eradicated when collected by said filters 44/46/48.

The water extermination zone or trap 705 of the present invention is formed by submerging an insect attractant device 200 under water as illustrated in FIGS. 8A and 8B. When submerged, the insect attractant device 200 contains optimized mycelia 60 (see also FIGS. 5-6). The insect attractant device 200 is configured to generate beneficial carbon dioxide and disperse the $CO_2$ to the surface of a body of water to advantageously form the water extermination zone 705. This zone or trap 705 is used to attract and lure insects such as mosquitoes to lay their eggs 707 in the serviced, stagnant water environments.

Insects such as mosquitoes generally lay their eggs in the evening after the sun has gone down. The solar-powered water pumping device 100 of the present invention is suitably configured to operate during the day and advantageously shut down at dusk. This advantageous feature prevents mosquitoes and other insects from detecting the portable water pumping device 100 at night with their infrared sensors. Thus, the insect will not sense the trap during the egg laying process. Once the eggs have been laid in the extermination zone or trap 705, the water pumping device 100 will turn on during the day and cause the water 3 containing the eggs 707 to circulate and then traverse (i.e., be pumped) to the filters 44/46/48 of the water pump 100 for extermination as illustrated in FIGS. 7, 8A, and 8B.

The use of the insect-attracting underwater carbon dioxide delivery system may alternatively comprise steps which include preparing a container having a gaseous exchange portal as an indoor growing environment for mycelia, sealing the container but for gaseous exchange portal, and placing the device underwater.

A method of supplementing carbon dioxide in an underwater environment to attract insects is set forth comprising the steps of acquiring a sealed container having a combination of respirating organisms 60, a food source 66, and a waterproof gaseous access 65, and fastening the sealed container underwater. The method finds commercial application in underwater environments such as in controlling breeding grounds for mosquito populations. The method may further comprise the steps of placing the sealed container in a protective housing and/or replacing the sealed container when the respirating organism stops producing carbon dioxide.

Figure 9:
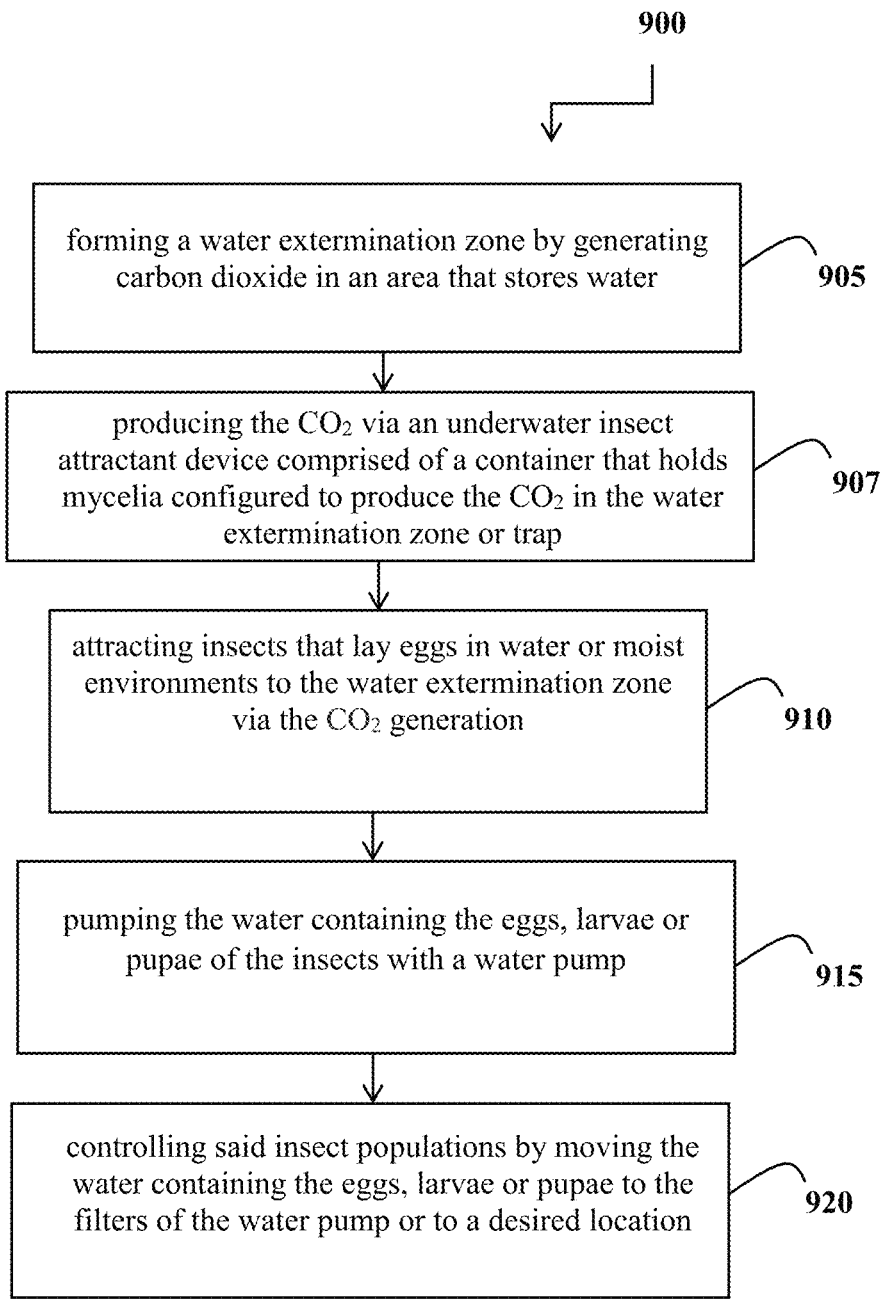
FIG. 9 represents an execution diagram for the method of eradicating and/or controlling mosquito populations or insect populations that lay their eggs in stagnant water environments.

FIG. 9 represents an execution diagram for the method 900 of eradicating insect populations. At block 905, the method comprises the step of forming a water extermination zone or trap by generating carbon dioxide in an area that stores water.

At block 910, the method comprises the step of attracting insects that generally lay eggs in water or moist environments to the water extermination zone via the $CO_2$ generation from an insect attractant device for luring said insects to lay their eggs on the surface of the water extermination zone or trap.

At block 915, the method comprises the step of moving, traversing or pumping the water containing the eggs, larvae or pupae of the insects with a solar water pump.

At block 920, the method comprises the step of controlling said insect populations by pumping the water containing the eggs, larvae or pupae to the filters of the solar water pump.

The method of the present invention further includes the step 907 of producing the $CO_2$ via an underwater insect attractant device comprised of a container that holds mycelia suitably configured to produce the $CO_2$ in the water extermination zone or trap 705.

It should be understood that the foregoing relates to various embodiments and uses of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICABILITY

The invention pertains to a method and system for eradicating and/or controlling insect populations such as mosquitoes, that lay eggs in stagnant water environments which may be of value or importance to various industries/nations such as, but not limited to, governmental disease and control organizations, public-health organizations, and similar agencies in nations around the world.

What is claimed is:

1. An insect-controlling water movement system, the system comprising:
    an underwater insect attractant device for generating carbon dioxide in a water extermination zone, wherein the underwater insect attractant device lures insects to cultivate future insect generations in the water extermination zone for pre-terrestrial, insect stages; and
    a water pumping device having a portable solar-powered pump, a plurality of plumbing parts and at least one filter configured to function in cooperation with the underwater insect attractant device,
    the portable solar-powered pump further comprising:
        an intake chamber,
        an outflow nozzle, and
        a pump housing;
    the plurality of plumbing parts further comprising:
        a drain vent fitting having at least one intake end and one coupling end,
        at least one atrium grate;
    wherein the at least one intake end of the drain vent fitting is coupled to the intake chamber of the solar-powered pump and the one coupling end of the drain vent fitting is coupled to the at least one atrium grate with the at least one filter is enclosed within the coupling of the at least one atrium grate at the at least one intake end,
    wherein a configuration of the plurality of plumbing parts provides a water-tight interference fit, whereby the water-tight interference fit is press or friction fit and wherein the water pumping device is configured to operate during daylight and shut down at dusk, thereby preventing mosquitoes from detecting the water pump at night, and
    wherein the water pumping device directs flow of water containing the future insect generations from the water extermination zone to the at least one filter of the water pumping device or to a desired location.

2. The system according to claim 1, wherein the underwater insect attractant device contains mycelia.

3. The system according to claim 1, wherein the solar-powered pump is further comprised of at least one solar panel remotely located and coupled by a solar panel connector, wherein the solar panel connector is an MC4 connector, and wherein the at least one solar panel is a monocrystalline solar panel.

4. The system according to claim 1, wherein the intake chamber has a diameter larger than the outflow nozzle, and substantially equal to the pump housing.

5. The system according to claim 1, wherein the underwater insect attractant device further comprises:
    a bladder configured to hold a mass of organisms and food;

an external shell for receiving and protecting the bladder; and a minimum of one gaseous interchange portal between a body of water and the mass of organisms and food, the gaseous interchange portal permitting movement of gases and preventing water from reaching the mass of organisms and food.

6. The system according to claim 5, wherein the gaseous interchange portal occurs in the bladder, wherein the external shell has at least one hole to allow the movement of water and air between the bladder and the body of water.

7. The system according to claim 1, wherein at least a portion of the underwater insect attractant device is secured below the surface of the water.

8. The system according to claim 1, wherein the underwater insect attractant device is comprised of:
 a double-bag container sealed by one or more seals;
 a population of organisms disposed within the double-bag container;
 a food substrate to feed the population of organisms disposed in the double-bag container;
 a breather patch located on each bag of the double-bag container, the breather patch having sufficient filtering capabilities to allow carbon dioxide molecules to leave the double-bag container and oxygen molecules to enter the double-bag container; and
 wherein the device is installed in an underwater environment to generate carbon dioxide within the water extermination zone, thereby attracting insects to lay their eggs therein.

9. A method of eradicating insect populations using the system of claim 1, the method comprising the steps of:
 forming the water extermination zone in an area that stores a volume of water;
 introducing carbon dioxide to the water extermination zone with the underwater insect attractant device to attract insects that lay eggs in the water extermination zone to reproduce insect progeny;
 pumping the volume of water containing the insect progeny through the at least one filter of the water pumping device; and
 controlling said insect populations by trapping and drowning the insect progeny.

10. The method according to claim 9, wherein the volume of water is stagnant.

\* \* \* \* \*